(12) United States Patent
Thomas et al.

(10) Patent No.: US 10,907,757 B2
(45) Date of Patent: Feb. 2, 2021

(54) SYSTEM AND METHOD FOR CONNECTING DUCT COMPONENTS IN A BOILER

(71) Applicant: GENERAL ELECTRIC TECHNOLOGY GMBH, Baden (CH)

(72) Inventors: Craig A Thomas, Manchester, CT (US); Joseph P. Ullrich, Sheffield, MA (US); Robert E Woods, Bloomfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 691 days.

(21) Appl. No.: 15/646,579

(22) Filed: Jul. 11, 2017

(65) Prior Publication Data
US 2019/0017639 A1   Jan. 17, 2019

(51) Int. Cl.
| | |
|---|---|
| *F16L 51/03* | (2006.01) |
| *F16L 27/08* | (2006.01) |
| *F16L 51/02* | (2006.01) |
| *F16L 59/21* | (2006.01) |
| *F22B 31/00* | (2006.01) |
| *F23C 10/18* | (2006.01) |

(52) U.S. Cl.
CPC ......... *F16L 27/0808* (2013.01); *F16L 51/025* (2013.01); *F16L 51/03* (2013.01); *F16L 59/21* (2013.01); *F22B 31/0084* (2013.01); *F23C 10/18* (2013.01)

(58) Field of Classification Search
CPC ..... F16L 51/025; F16L 51/03; F16L 27/0808; F16L 59/21; F22B 31/0084; F23C 10/18
See application file for complete search history.

(56) References Cited

U.S. PATENT DOCUMENTS

| | | | |
|---|---|---|---|
| 2,547,746 A | 4/1951 | Cook | |
| 3,730,566 A | 5/1973 | Kazmierski, Jr. et al. | |

(Continued)

FOREIGN PATENT DOCUMENTS

| | | | |
|---|---|---|---|
| AT | 374 917 B | 6/1984 | |
| CA | 2400726 A1 * | 9/2001 | ............ F22B 37/244 |

(Continued)

OTHER PUBLICATIONS

International Search Report and Written Opinion issued in connection with corresponding PCT Application No. PCT/EP2018/068075 dated Nov. 14, 2018.

*Primary Examiner* — David Bochna
*Assistant Examiner* — James A Linford
(74) *Attorney, Agent, or Firm* — Grogan, Tuccillo & Vanderleeden, LLP (57) ABSTRACT

An expansion joint for a solids return system includes a female joint portion, a male joint portion received by the female joint portion, the male joint portion and the female joint portion forming a lateral breach therebetween, a double rope seal positioned within the lateral breach, the double rope seal being configured to accommodate relative lateral movement between the female joint portion and the male joint portion, and an insulating pillow received about the male joint portion and abutting a distal end surface of the female joint portion, the insulating pillow being configured to accommodate relative axial movement between the female joint portion and the male joint portion.

15 Claims, 5 Drawing Sheets

(56) References Cited

U.S. PATENT DOCUMENTS

| | | | | |
|---|---|---|---|---|
| 4,457,289 A | * | 7/1984 | Korenberg | F22B 31/0092 |
| | | | | 122/4 D |
| 4,938,171 A | * | 7/1990 | Detzel | F16L 59/12 |
| | | | | 122/4 D |
| 5,167,430 A | * | 12/1992 | Bainbridge | F01N 13/1811 |
| | | | | 181/222 |
| 5,311,715 A | | 5/1994 | Linck et al. | |
| 5,378,026 A | | 1/1995 | Ninacs et al. | |
| 5,383,316 A | | 1/1995 | Burke et al. | |
| 5,406,914 A | * | 4/1995 | Hyppanen | B01J 8/1836 |
| | | | | 122/4 D |
| 5,463,968 A | * | 11/1995 | Abdulally | F22B 31/0084 |
| | | | | 110/245 |
| 5,560,166 A | | 10/1996 | Burke et al. | |
| 2011/0226195 A1 | * | 9/2011 | Hansen | F23C 10/10 |
| | | | | 122/4 D |

FOREIGN PATENT DOCUMENTS

| | | | | |
|---|---|---|---|---|
| CN | 205227300 U | | 5/2016 | |
| DE | 2459180 A1 | * | 6/1976 | F16L 59/16 |
| EP | 0 559 387 A1 | | 9/1993 | |
| WO | WO-2012132640 A1 | * | 10/2012 | F02C 7/28 |

\* cited by examiner

SYSTEM AND METHOD FOR CONNECTING DUCT COMPONENTS IN A BOILER

BACKGROUND

Technical Field

Embodiments of the invention relate generally to power generation and, more particularly, to a system and method for connecting duct components of a CFB boiler in a manner that accommodates relative movement between such components.

Discussion of Art

Heat generating systems with furnaces for combusting fossil fuels have long been employed to generate controlled heat, with the objective of doing useful work. For example, the heat generated may be utilized to produce steam for driving turbines that produce electric power. Modern water-tube furnaces for steam generation can be of various types including fluidized-bed boilers. While there are various types of fluidized-bed boilers, all operate on the principle that a gas is injected to fluidize solids prior to combustion in the reaction chamber. In circulating fluidized-bed (CFB) type boilers, a gas, e.g., air, is passed through a bed of solid particles to produce forces that tend to separate the particles from one another. As the gas flow is increased, a point is reached at which the forces on the particles are just sufficient to cause separation. The bed then becomes fluidized, with the gas cushion between the solids allowing the particles to move freely and giving the bed a liquid-like characteristic. The bulk density of the bed is relatively high at the bottom and decreases as it flows upward through the reaction chamber where fuel is combusted to generate heat.

The solid particles forming the bed of the circulating fluidized bed boiler typically include fuel particles, such as crushed coal or other solid fuel, and sorbent particles, such as crushed limestone, dolomite or other alkaline earth material. Combustion of the fuel in the reaction chamber of the boiler produces flue gas and ash. During the combustion process, the sulfur in the fuel is oxidized to form sulfur dioxide ($SO_2$), which is mixed with the other gasses in the furnace to form the flue gas. The ash consists primarily of unburned fuel, inert material in the fuel, and sorbent particles, and is sometimes referred to as bed materials or re-circulated solids.

The ash is carried entrained in the flue gas in an upwardly flow and is exhausted from the furnace with the hot flue gas. After being exhausted from the furnace, the flue gas and ash are directed to a separator, such as a cyclone, to remove the ash from the flue gas. The separated ash is then re-circulated back to furnace of the boiler via a return duct. In the return duct, a solids flow control valve, also referred to as a seal pot, is typically utilized to control the re-circulation of the separated solids back to the furnace.

In many boilers, including circulating fluidized bed boilers, refractory lined ductwork is utilized due to high temperatures and solids flow. Due to expansion movement differences between the furnace, cyclones and ash return systems, expansion joints are typically utilized between the cyclone and seal pot as well as between the seal pot and furnace. These joints must be designed to allow uninhibited expansion movement between the major CFB unit components and they must also have the ability to prevent ingress and/or leakage of ash from inside the CFB.

One of the remaining challenges in accommodating large lateral movements has been preventing the cavity of the expansion joint from being filled with ash and solids. In particular, when the expansion joint goes through heating and cooling cycles, invasive ash and solids particles can become compacted in the cavity of the joint, which can compromise the integrity of the expansion joint or the surrounding elements. Previous attempts have been made to seal the cavities or provide means to drain the cavities, with only limited success.

In view of the above, there is a need for a system and method of connecting duct sections within the ash return system of a boiler in a manner that provides an effective, non-maintenance intensive means of accommodating large lateral and axial movements between parts, as well as provides both insulation and sealing.

BRIEF DESCRIPTION

In an embodiment, a system for interconnecting duct sections of a solids return system of a boiler is provided. The system includes a first conduit defining a female joint portion, a second conduit defining a male joint portion that is received by the female joint portion, a lateral breach formed between an outer peripheral surface of the male joint portion and an inner peripheral surface of the female joint portion, and a rope seal positioned within the lateral breach and being configured to inhibit the incursion of solids into the lateral breach. The rope seal is positioned radially outward of the outer peripheral surface of the male joint portion and radially inward of the inner peripheral surface of the female joint portion.

According to another embodiment of the invention, an expansion joint for a solids return system includes a female joint portion, a male joint portion received by the female joint portion, the male joint portion and the female joint portion forming a lateral breach therebetween, a double rope seal positioned within the lateral breach, the double rope seal being configured to accommodate relative lateral movement between the female joint portion and the male joint portion, and an insulating pillow received about the male joint portion and abutting a distal end surface of the female joint portion, the insulating pillow being configured to accommodate relative axial movement between the female joint portion and the male joint portion.

According to yet another embodiment of the invention, a method for interconnecting duct sections of a solids return system is provided. The method includes the steps of securing a sealing element to a male joint portion of a second conduit, securing an insulating pillow to a female joint portion of a first conduit, aligning axially the male joint portion of the second conduit with a female joint portion of a first conduit to form a lateral breach between an outer peripheral surface of the male joint portion and an inner peripheral surface of the female joint portion, and positioning the sealing element within the lateral breach. The insulating pillow is configured to be received about the male joint portion and abut a distal end surface of the female joint portion when the second conduit is aligned with the first conduit. The sealing element is configured to accommodate lateral movement between the first conduit and the second conduit and the insulating pillow is configured to accommodate axial movement between the first conduit and the second conduit.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in a circulating fluidized bed boiler, the invention can also be employed in other boiler systems, more generally. In addition, it is contemplated that the system and method of the invention may be utilized to connect two adjacent duct sections or components configured for fluid or solids flow therethrough, in order to accommodate relative movement of the parts (both axial and/or lateral) due to thermal expansion, contraction or other forces, regardless of particular application or industry. In particular, embodiments of the invention are suitable for connecting fluid or solids flow components to one another in a manner to accommodate relative movement between the respective components, regardless of the environment within which such components are utilized or the type of fluids or solids transmitted therethrough.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer. As used herein, "solids" means solid particles intended for use in a combustion process or a chemical reaction such as, for example, coal particles or a metal oxide (e.g., calcium).

Embodiments of the invention relate to an expansion joint and related system and method for connecting duct sections of a ash/solids return system. The expansion joint for a solids return system includes a female joint portion, a male joint portion received by the female joint portion, the male joint portion and the female joint portion forming a lateral breach therebetween, a double rope seal positioned within the lateral breach, the double rope seal being configured to accommodate lateral movement between the female joint portion and the male joint portion, and an insulating pillow received about the male joint portion and abutting a distal end surface of the female joint portion, the insulating pillow being configured to accommodate axial movement between the female joint portion and the male joint portion.

Figure 1:
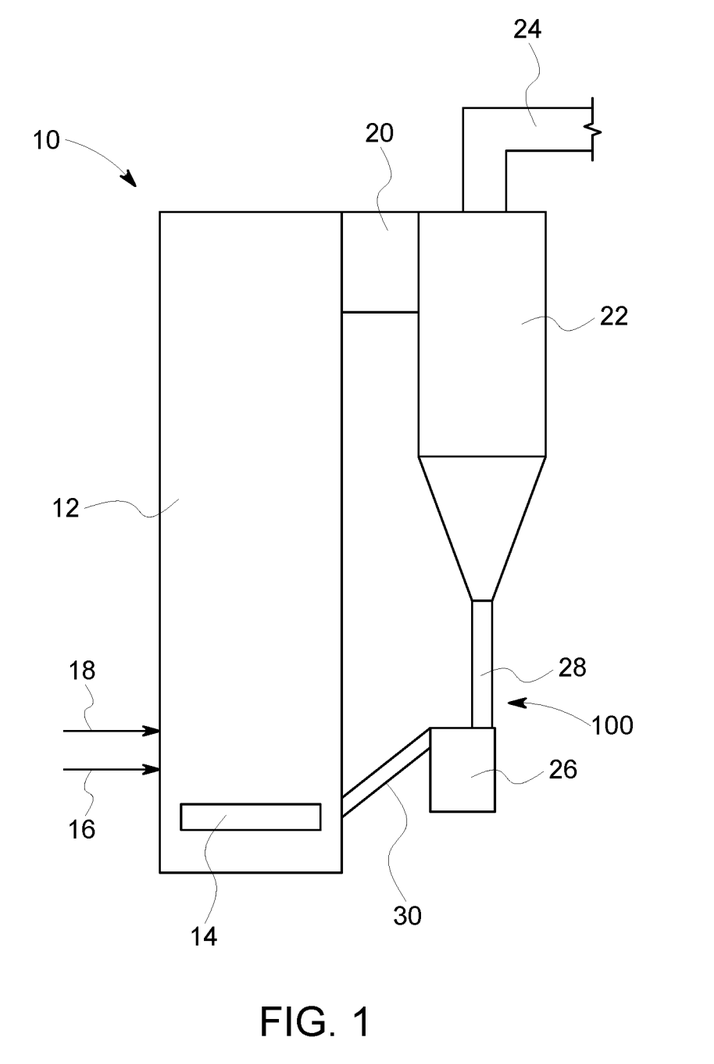
FIG. 1 is a schematic illustration of a circulating fluidized bed boiler.

With reference to FIG. 1, a circulating fluidized bed (CFB) boiler 10 is illustrated. As shown therein, the boiler 10 includes a furnace or combustion chamber 12 having a fluidized bed 14 that is fed with a fuel such as, for example, pulverized coal, via a conveying line 16, and a sorbent such as, for example, crushed limestone, via a conveying line 18. The boiler also includes a flue gas passageway 20 exiting the furnace 12, and a separator 22 in fluid communication with the flue gas passageway 20. While the separator 22 is illustrated as a cyclone separator, other types of separators may also be utilized without departing from the broader aspects of the invention.

The flue gas and ash generated in the furnace 12 of the circulating fluidized bed boiler 10 are exhausted from the furnace 12 via the flue gas passageway 20. As is well understood, the flue gas serves as a carrier and transports the ash entrained therewith from the furnace 12. The separator 22 is employed to separate from the flue gas the ash that is entrained therewith. From the separator, the flue gas, which is now substantially free of the ash previously entrained therewith, is transported via an exhaust passageway 24 to downstream processing equipment, e.g., heat exchangers, air pollution control (APC) equipment, and thereafter ultimately to an exhaust stack.

The ash, also referred to herein as separated solids, after being separated from the flue gas in the separator 18 is directed back to the furnace 12 via an ash return system 100. As illustrated in FIG. 1, the ash return system 100 includes a solids flow control valve or seal pot 26. Separated solids travel from the separator 22 into the seal pot 26 via a standpipe or dipleg 28, whose lower end constitutes a down-leg for the seal pot 26 (also referred to herein as a seal pot outlet), and return from the seal pot 26 into the furnace 12 along a downwardly inclined solids return duct 30. The ash return system 100 thus includes the dipleg 28, the seal pot 26 and the solids return duct 30.

Figure 2:
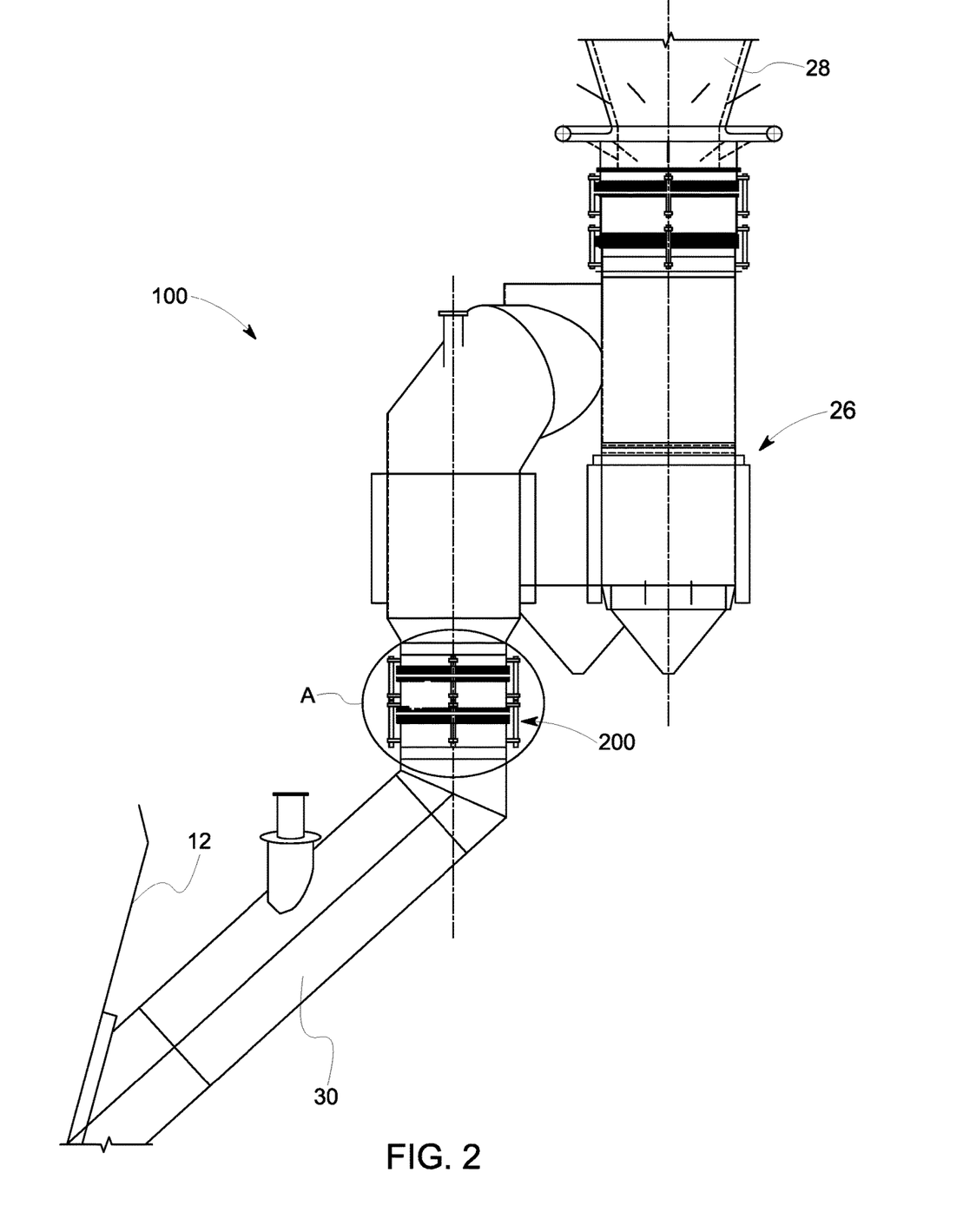
FIG. 2 is a schematic illustration of a portion of an ash return system of the fluidized bed boiler of FIG. 1.
Figure 3:
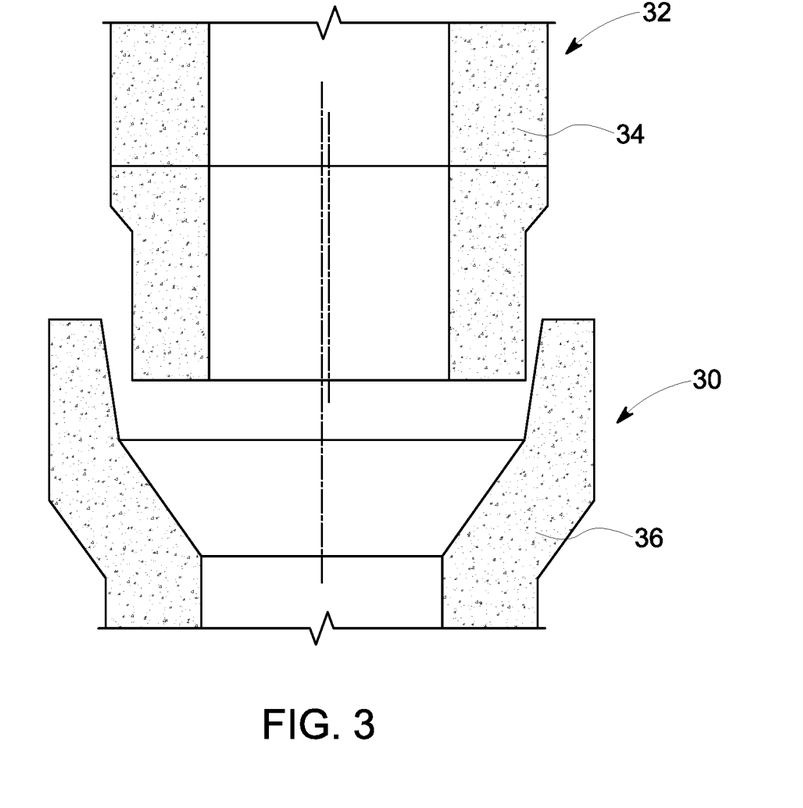
FIG. 3 is a simplified schematic illustration of an exemplary interface between a seal pot outlet and a solids return duct of the ash return system, within which the expansion joint of the present invention may be employed.

During operation of the boiler 10, heating and cooling cycles can cause relatively large lateral and axial movements between the furnace 12, separator 22 and ash return system 100. Accordingly, expansion joints are employed between the separator 22 and the seal pot 26, and between the seal pot 26 and the furnace 12. More specifically, in an embodiment, expansion joints are utilized to fluidly connect the dipleg 28 to the seal pot 26 and the seal pot 26 to the return conduit 30. For example, FIG. 2 illustrates a portion of the ash return system 100, showing the location of an expansion joint 200 between the seal pot 26 and the return conduit 30, while FIG. 3 shows the general configuration of the interface between such components, within which the expansion joint 200 may be employed. For example, as shown in FIG. 3, the expansion joint 200 may be utilized to connect a male duct portion, e.g., a seal pot outlet 32 of the seal pot 26, to a female duct portion, e.g., the solids return duct 30. As illustrated in FIG. 3, the male duct portion 32 and female duct portion may each be outfitted with refractory linings 34, 36, respectively, on the inner surfaces thereof.

Figure 4:
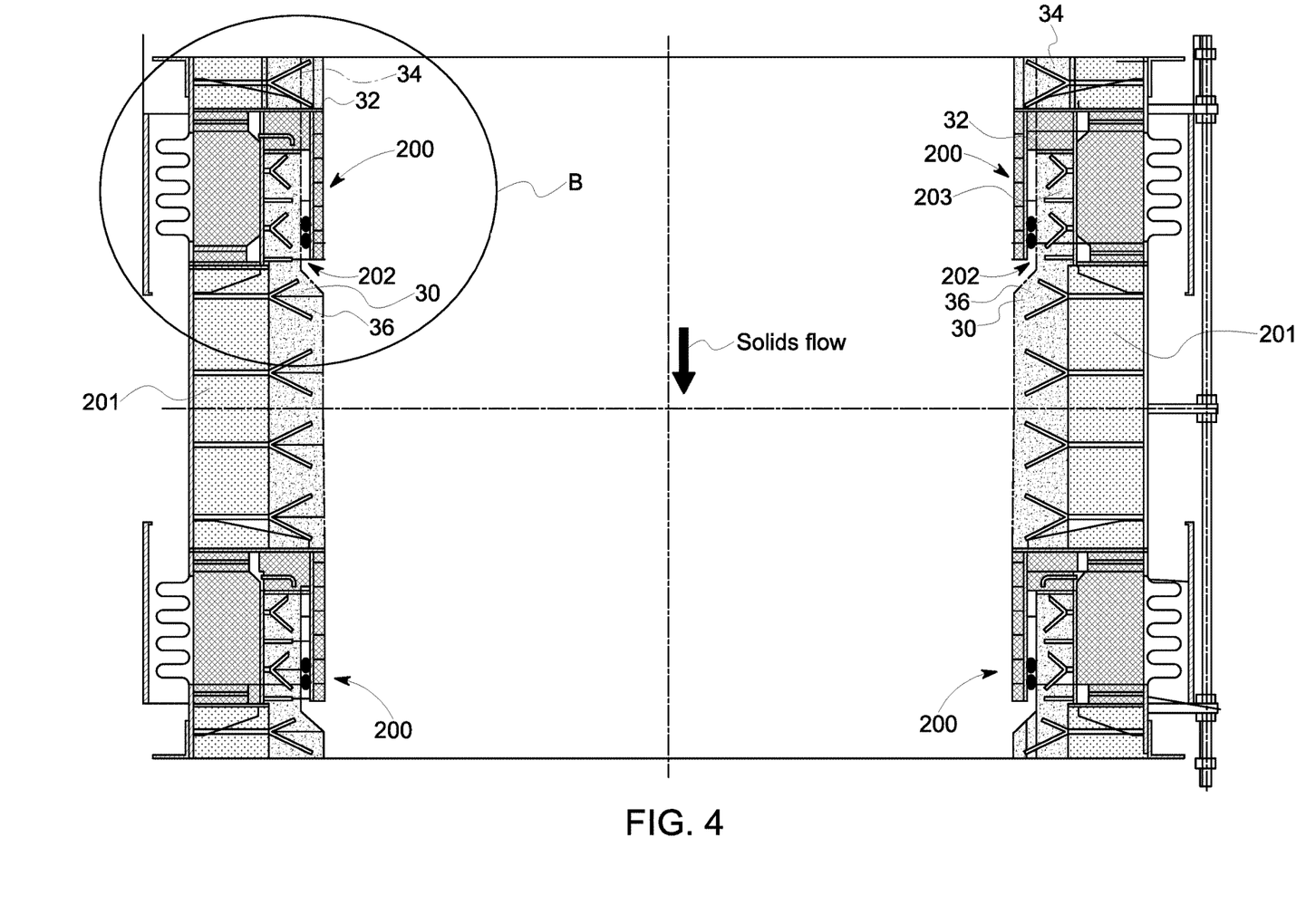
FIG. 4 is a cross-sectional illustration of area A of FIG. 2, illustrating an expansion joint between a seal pot outlet and a solids return duct of the ash return system, according to an embodiment of the invention.
Figure 5:
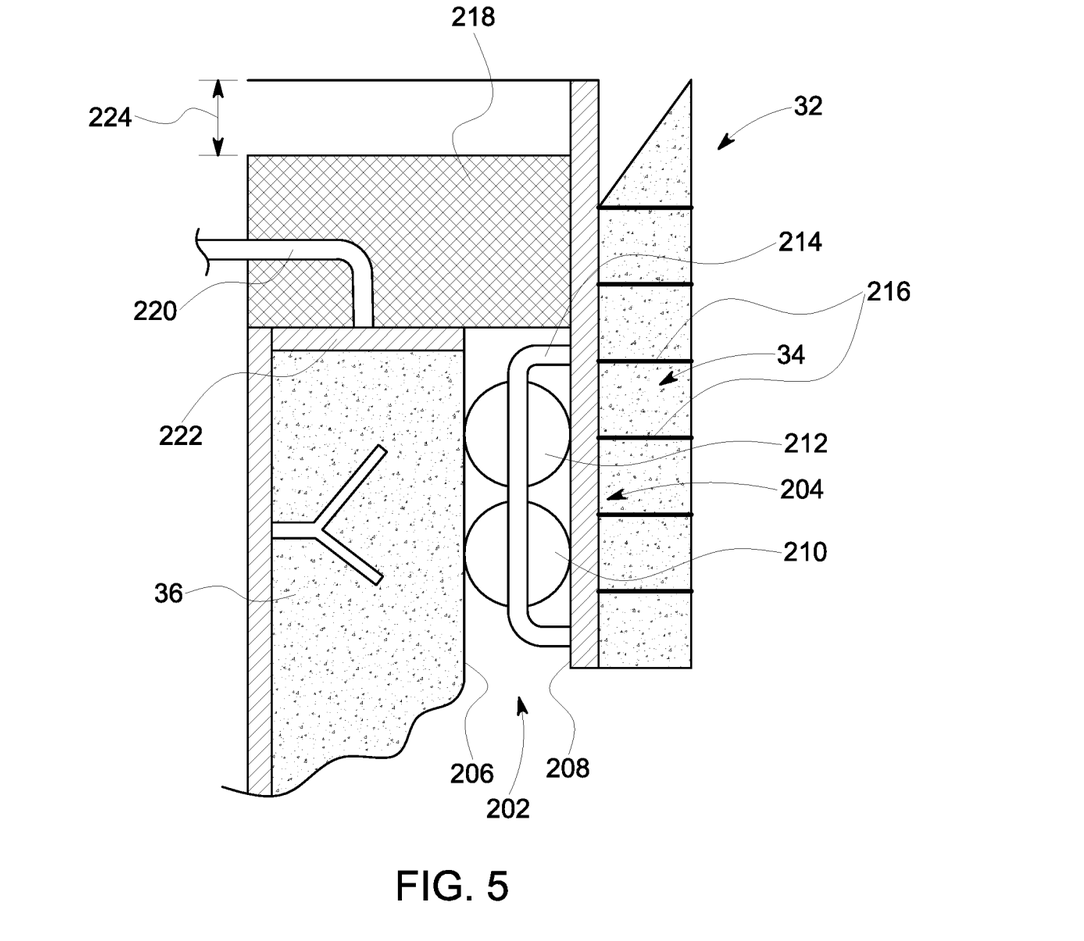
FIG. 5 is an enlarged, cross-sectional illustration of area B of FIG. 4, illustrating the configuration of the expansion joint.

Referring now to FIGS. 4 and 5, detail views of the expansion joint 200 are shown. The expansion joint 200 includes a first conduit (e.g., the solids return duct 30), a second conduit (e.g., the seal pot outlet 32), and a generally cylindrical ring 201 intermediate the first conduit and the second conduit for interconnecting the first conduit with the second conduit. In particular, the connecting ring 201 is configured to receive, at a lower end thereof, the upper end of the solids return duct 30, and at an upper end thereof, the lower end of the seal pot outlet 32. For example, as best shown in FIG. 4, the cylindrical connecting ring 201 includes a female joint portion 203 at its upper end that is configured to receive therein a male joint portion of the second conduit (e.g., the seal pot outlet 32).

As best illustrated in FIG. 5, the female joint portion 203 of the connecting ring 201 and the male joint portion of the second conduit 32 define therebetween a lateral breach 202. As illustrated therein, the expansion joint 200 further includes a rope seal 204 positioned within the breach 202 between an inner peripheral surface 206 of the female joint portion and an outer peripheral surface 208 of a cantilevered section of the male joint portion. That is, the rope seal 204 is positioned radially outward of the male joint portion and radially inward of the female joint portion.

In an embodiment, the rope seal 204 is a double rope seal having a first fiber rope 210 and a second fiber rope 212 axially adjacent one another within the lateral breach 202. In an embodiment, the fiber ropes 210, 212 are ceramic fiber ropes, although other materials may be utilized without departing from the broader aspects of the invention. Fiber rope 210 functions as the primary seal to prevent the incursion of ash and other solids into the breach 202, while fiber rope 212 functions as a backup. The double rope seal, formed from adjacent ceramic fiber ropes, performs particularly well in the hot, pressurized environment within the ash return system, and substantially maintains its integrity throughout all operating conditions over long periods of time. It has been found, as a result, that the double rope seal substantially prevents bypass and accumulation/packing of ash and other solids at the joint.

As illustrated in FIG. 5, the fiber ropes 210, 212 are anchored to the male joint portion of the expansion joint 200 with steel wire 214. For example, as shown therein, the steel wire 214 may be secured to both fiber ropes 210, 212, thereby holding the ropes 210, 212 in position with respect to one another, as well as in position within the lateral breach 202. That is, the steel wire 214 prevents relative movement between the ropes 210, 212 themselves, as well as between the ropes 210, 212 and the male joint portion to which they are secured.

As also illustrated in FIG. 5, the expansion joint 200 further includes hex mesh 216 that is utilized to anchor or secure the refractory lining 34 to the cantilevered section of the male joint portion to prevent spawling and breakage. The hex mesh anchoring 216 also maintains roundness of the refractory lining 34 (i.e., the cylindrical nature of the refractor lining 34), which helps to ensure smooth operation. In an embodiment, the hex mesh 216 may be about 25 millimeter to about 50 millimeter hex mesh with or without lances. In an embodiment, the hex mesh may be a 25 millimeter stainless steel hex mesh with lances.

As further shown in FIG. 5, the expansion joint 200 also includes an insulating pillow 218 that is anchored to the outside of the breach 202 (e.g., to the female joint portion) utilizing steel wire 220. In an embodiment, the insulating pillow 218 is received about an outer peripheral surface of the male joint portion and abuttingly engages a distal end surface of the female joint portion. The insulating pillow 218 may be formed from an insulating material such as, for example a ceramic fiber. The insulating pillow 218 is configured to allow for axial (vertical) displacement of the female joint portion (namely, the ash return duct 30) upon being heated to operating temperature, and thus provides sealing functionality for any axial breach 224.

As described above, the double rope seal, hex mesh and insulating pillow configuration is utilized to join the outlet of a seal pot to an upper end of a connecting ring 201 of the expansion joint. A similar sealing arrangement may also be utilized to join the upper end of a solids return duct to the lower end of the connecting ring 201, as shown in FIG. 4. Accordingly, the upper and lower sealing arrangements, together with bellows and other hardware shown in FIG. 5, comprise the expansion joint of the invention.

While the expansion joint described herein contemplates that the seal pot outlet may be joined to the solids return duct through the connecting ring 201 (i.e., utilizing both upper and lower sealing arrangements each comprising a double rope seal, hex mesh and insulating pillow), it is contemplated that the connecting ring 201 may be omitted in certain embodiments, and that the seal pot outlet (defining the male joint portion) may be directly connected to the solids return duct (defining the female joint portion).

As described above, the expansion joint and related system and method for connecting duct components of an ash/solids return system accommodates large axial and lateral movements resulting from high temperatures and solids flow, and inhibits or substantially minimizes the accumulation of ash and solids in the space between the respective duct components. This in turn, helps to increase the service life of the duct components. In contrast to existing systems and devices, the expansion joint of the invention provides an effective, non-maintenance intensive means of accommodating large lateral movements, as well as provides for both insulation and sealing. Through testing, it has been discovered that the expansion joint describe herein can accommodate movements in excess of 80 millimeters, with a toggle length of 2200 millimeters.

In an embodiment, a system for interconnecting duct sections of a solids return system of a boiler is provided. The system includes a first conduit defining a female joint portion, a second conduit defining a male joint portion that is received by the female joint portion, a lateral breach formed between an outer peripheral surface of the male joint portion and an inner peripheral surface of the female joint portion, and a rope seal positioned within the lateral breach and being configured to inhibit the incursion of solids into the lateral breach. The rope seal is positioned radially outward of the outer peripheral surface of the male joint portion and radially inward of the inner peripheral surface of the female joint portion. In an embodiment, the rope seal is a double rope seal having a first fiber rope and a second fiber rope axially adjacent to one another within the lateral breach. In an embodiment, the first fiber rope and the second fiber rope are ceramic fiber ropes. In an embodiment, the system may also include a steel wire anchoring the first fiber rope and the second fiber rope to the second conduit. In an embodiment, the system may further include a second refractory material lining an inner periphery of the second conduit, and a hex mesh securing the second refractory material to the second conduit. In an embodiment, the hex mesh is a 25 millimeter, stainless steel hex mesh with lances. In an embodiment, an insulating pillow is received about the male joint portion and abuts a distal end surface of the female joint portion. In an embodiment, the insulating pillow is secured to the female joint portion with wire. In an embodiment, the first conduit forms a portion of a solids return duct configured to return separated solids to a furnace, and the second conduit forms a portion of a seal pot outlet. In an embodiment, the first conduit forms a portion of a seal pot inlet, and the second conduit forms a portion of a dipleg configured to receive solids from a separator.

According to another embodiment of the invention, an expansion joint for a solids return system includes a female joint portion, a male joint portion received by the female joint portion, the male joint portion and the female joint portion forming a lateral breach therebetween, a double rope seal positioned within the lateral breach, the double rope seal being configured to accommodate relative lateral movement between the female joint portion and the male joint portion, and an insulating pillow received about the male joint portion and abutting a distal end surface of the female joint portion, the insulating pillow being configured to accommodate relative axial movement between the female joint portion and the male joint portion. In an embodiment, the double rope seal is secured to the male joint portion. In an embodiment, the double rope seal includes a first fiber rope and a second fiber rope axially adjacent to one another within the lateral breach. In an embodiment, the first fiber rope and the second fiber rope are ceramic fiber ropes. In an embodiment, the insulating pillow is secured to the female joint portion. In an embodiment, the expansion joint further includes a refractory material lining an inner periphery of the male joint portion, and a hex mesh securing the second refractory material to the male joint portion. In an embodiment, the female joint portion forms a part of a solids return duct configured to return separated solids to a furnace and the male joint portion forms a part of a seal pot outlet.

According to yet another embodiment of the invention, a method for interconnecting duct sections of a solids return system is provided. The method includes the steps of securing a sealing element to a male joint portion of a second conduit, securing an insulating pillow to a female joint portion of a first conduit, aligning axially the male joint portion of the second conduit with a female joint portion of a first conduit to form a lateral breach between an outer peripheral surface of the male joint portion and an inner peripheral surface of the female joint portion, and positioning the sealing element within the lateral breach. The insulating pillow is configured to be received about the male joint portion and abut a distal end surface of the female joint portion when the second conduit is aligned with the first conduit. The sealing element is configured to accommodate lateral movement between the first conduit and the second conduit and the insulating pillow is configured to accommodate axial movement between the first conduit and the second conduit. In an embodiment, the sealing element is a double rope seal having a first ceramic fiber rope and a second ceramic fiber rope axially adjacent to one another within the lateral breach. In an embodiment, the method also includes the step of securing a refractory material to the male joint portion with a hex mesh.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system for interconnecting duct sections of a solids return system of a boiler, comprising:
    a first conduit defining a female joint portion;
    a second conduit defining a male joint portion that is received by the female joint portion;
    a lateral breach formed between an outer peripheral surface of the male joint portion and an inner peripheral surface of the female joint portion; and
    a rope seal positioned within the lateral breach and being configured to inhibit the incursion of solids into the lateral breach;
    wherein the rope seal is positioned radially outward of the outer peripheral surface of the male joint portion and radially inward of the inner peripheral surface of the female joint portion;
    wherein the rope seal is a double rope seal having a first fiber rope and a second fiber rope axially adjacent to one another within the lateral breach;
    a steel wire anchoring the first fiber rope and the second fiber rope to the second conduit;
    a second refractory material lining an inner periphery of the second conduit; and
    a hex mesh securing the second refractory material to the second conduit.

2. The system of claim 1, wherein:
    the first fiber rope and the second fiber rope are ceramic fiber ropes.

3. The system of claim 1, wherein:
    the hex mesh is about 25 millimeter to about 50 millimeter stainless steel hex mesh with internal lances.

4. The system of claim 1, further comprising:
    an insulating pillow received about the male joint portion and abutting a distal end surface of the female joint portion.

5. The system of claim 4, further comprising:
    a second wire securing the insulating pillow to the female joint portion.

6. The system of claim 5, wherein:
    the first conduit forms a portion of a solids return duct configured to return separated solids to a furnace; and
    the second conduit forms a portion of a seal pot outlet.

7. The system of claim 5, wherein:
    the first conduit forms a portion of a seal pot inlet; and
    the second conduit forms a portion of a dipleg configured to receive solids from a separator.

8. An expansion joint for a solids return system, comprising:
    a female joint portion;
    a male joint portion received by the female joint portion, the male joint portion and the female joint portion forming a lateral breach therebetween;
    a double rope seal positioned within the lateral breach, the double rope seal being configured to accommodate relative lateral movement between the female joint portion and the male joint portion;
    wherein the double rope seal includes a first fiber rope and a second fiber rope axially adjacent to one another within the lateral breach;
    a steel wire anchoring the first fiber rope and the second fiber rope to the male joint portion; and an insulating pillow received about the male joint portion and abutting a distal end surface of the female joint portion, the insulating pillow being configured to accommodate relative axial movement between the female joint portion and the male joint portion.

9. The expansion joint of claim 8, wherein:
the first fiber rope and the second fiber rope are ceramic fiber ropes.

10. The expansion joint of claim 8, wherein:
the insulating pillow is secured to the female joint portion.

11. The expansion joint of claim 10, further comprising:
a refractory material lining an inner periphery of the male joint portion; and
a hex mesh securing the second refractory material to the male joint portion.

12. The expansion joint of claim 8, wherein:
the female joint portion forms a part of a solids return duct configured to return separated solids to a furnace; and
the male joint portion forms a part of a seal pot outlet.

13. A method for interconnecting duct sections of a solids return system, comprising the steps of:
securing a sealing element to a male joint portion of a second conduit;
securing an insulating pillow to a female joint portion of a first conduit;
aligning axially the male joint portion of the second conduit with a female joint portion of a first conduit to form a lateral breach between an outer peripheral surface of the male joint portion and an inner peripheral surface of the female joint portion; and
positioning the sealing element within the lateral breach;
wherein the insulating pillow is configured to be received about the male joint portion and abut a distal end surface of the female joint portion when the second conduit is aligned with the first conduit;
wherein the sealing element is configured to accommodate lateral movement between the first conduit and the second conduit;
wherein the sealing element is a double rope seal having a first ceramic fiber rope and a second ceramic fiber rope axially adjacent to one another within the lateral breach, with a steel wire anchoring the first fiber rope and the second fiber rope to the second conduit; and
wherein the insulating pillow is configured to accommodate axial movement between the first conduit and the second conduit.

14. The method according to claim 13, further comprising the step of:
securing a refractory material to the male joint portion with a hex mesh.

15. A system for interconnecting duct sections of a solids return system of a boiler, comprising:
a first conduit defining a female joint portion;
a second conduit defining a male joint portion that is received by the female joint portion;
a lateral breach formed between an outer peripheral surface of the male joint portion and an inner peripheral surface of the female joint portion;
a rope seal positioned within the lateral breach and being configured to inhibit the incursion of solids into the lateral breach;
wherein the rope seal is positioned radially outward of the outer peripheral surface of the male joint portion and radially inward of the inner peripheral surface of the female joint portion;
wherein the rope seal is a double rope seal having a first fiber rope and a second fiber rope axially adjacent to one another within the lateral breach, and a steel wire anchoring the first fiber rope and the second fiber rope to the second conduit;
an insulating pillow received about the male joint portion and abutting a distal end surface of the female joint portion.

* * * * *